US009516115B2

United States Patent
Chang

(10) Patent No.: US 9,516,115 B2
(45) Date of Patent: Dec. 6, 2016

(54) SOFTPHONE USER INTERFACE SYSTEM AND METHOD

(71) Applicant: Software 263 Technology (Beijing) Co., Ltd., Beijing (CN)

(72) Inventor: Shen Chang, Beijing (CN)

(73) Assignee: Software 263 Technology (Beijing) Co., Ltd. (CN)

( * ) Notice: Subject to any disclaimer, the term of this patent is extended or adjusted under 35 U.S.C. 154(b) by 0 days.

(21) Appl. No.: 14/561,898

(22) Filed: Dec. 5, 2014

(65) Prior Publication Data

US 2016/0165032 A1    Jun. 9, 2016

(51) Int. Cl.
| | |
|---|---|
| H04B 1/40 | (2015.01) |
| G06F 3/0488 | (2013.01) |
| H04M 1/725 | (2006.01) |
| H04L 29/08 | (2006.01) |
| H04M 1/253 | (2006.01) |
| H04M 1/2745 | (2006.01) |

(52) U.S. Cl.
CPC ........ *H04L 67/142* (2013.01); *H04M 1/72519* (2013.01); *H04M 1/2535* (2013.01); *H04M 1/274525* (2013.01); *H04M 2250/22* (2013.01)

(58) Field of Classification Search
USPC ...... 455/414.1, 416, 566; 370/352; 715/781, 715/783
See application file for complete search history.

(56) References Cited

U.S. PATENT DOCUMENTS

| | | | | |
|---|---|---|---|---|
| 2008/0168348 | A1* | 7/2008 | Bergstrom | H04L 51/04 715/700 |
| 2008/0192732 | A1* | 8/2008 | Riley | H04L 12/66 370/352 |
| 2008/0250475 | A1* | 10/2008 | Tam | H04M 1/2478 726/3 |
| 2010/0061276 | A1 | 3/2010 | Havens et al. | |
| 2010/0220435 | A1 | 9/2010 | Fahey et al. | |
| 2013/0046544 | A1* | 2/2013 | Kay | G06F 3/04883 704/275 |
| 2013/0318470 | A1 | 11/2013 | Kao et al. | |
| 2013/0321340 | A1 | 12/2013 | Seo et al. | |
| 2014/0149919 | A1* | 5/2014 | Larson | G06F 3/0482 715/783 |
| 2015/0140981 | A1* | 5/2015 | Balasaygun | H04W 4/24 455/418 |

* cited by examiner

*Primary Examiner* — Blane Jackson
(74) *Attorney, Agent, or Firm* — Terrile, Cannatti, Chambers & Holland, LLP; Michael Rocco Cannatti

(57) ABSTRACT

A softphone feature interface method, system, and apparatus are provided for operating a mobile communication device as a softphone to place Internet phone calls by displaying a home user interface on a touch screen with a unified view having a display interface area and a keyboard interface area, and then displaying a second user interface on the touch screen for displaying user call information in response to receiving touch input on the home user interface of the touch screen to display a list of contacts that match a contact result search entered on the search keypad or to display a contacts user interface or voicemail user interface in response to detecting a slide operation on the home user interface or to display one or more calling methods available for selection in response to detecting a call button being pressed for a minimum specified hold time.

26 Claims, 10 Drawing Sheets

SOFTPHONE USER INTERFACE SYSTEM AND METHOD

BACKGROUND OF THE INVENTION

1. Field of the Invention

The present invention is directed in general to an Internet phone service system and method for operating same. In one aspect, the present invention relates to a softphone user interface and method of using a softphone interface to provide improved communication functionality for softphone users.

2. Description of the Related Art

A softphone is a software program for making telephone calls over the Internet network and telecom network using a computer-based device, as opposed to dedicated telephony hardware. Existing softphone designs typically include standard telephony features (DND, Mute, DTMF, Flash, Hold, Transfer etc.), along with additional telecommunication services (such as phone call, voicemail, Direct Inward Dial (DID) number, etc.), call assist features (such as a contact list, call history, etc.), and additional features typical for online messaging, such as user presence indication, video, wide-band audio, and the like. With the introduction of improved hardware (e.g., touch screen input/output displays) and operating systems (e.g., (e.g., Android, IOS, LINUX, UNIX, OS X, WINDOWS, etc.) in recent years, telephonic computing devices with cellular and/or wireless network capabilities and Internet Protocol (IP) desktop phones, such as iPhones and Android phones, are now available to provide enhanced communication features. However, as the number and complexity of softphone communication features increases, the ability of the user to efficiently navigate and operate the softphone communication features are extremely difficult at a practical level.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
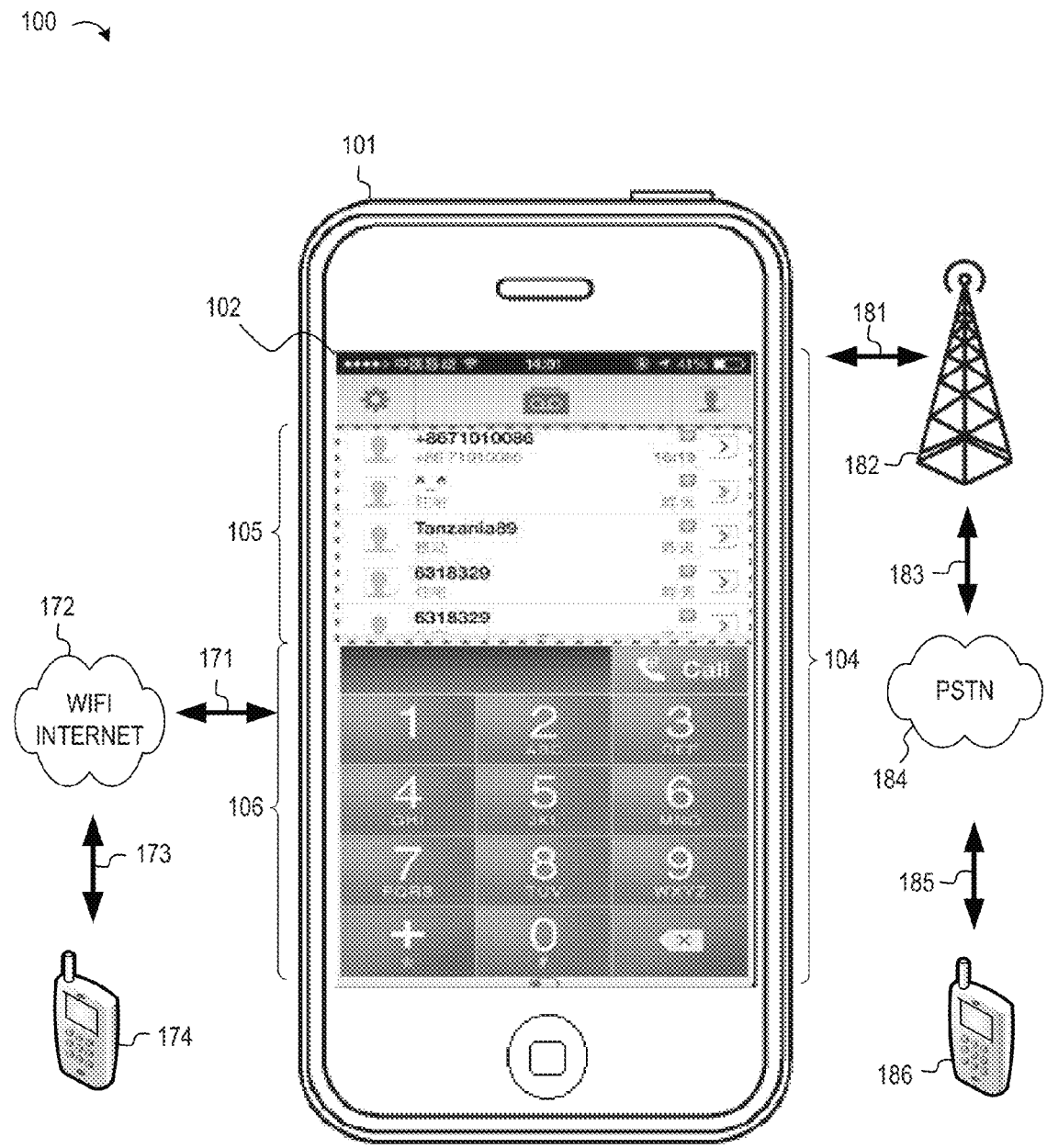
FIG. 1 shows a simplified illustration of a communication network with a communication device having a first softphone user interface functionality for providing a unified view to display a list of recent phone call records and contacts that match a contact result search entered on the search keypad in accordance with selected embodiments of the present disclosure.

Broadly speaking, selected embodiments of the present disclosure provide a system, method, and apparatus for providing a communication device with a softphone communication function that uses the processing power of a smart mobile phone to provide feature interfaces that will elevate the user experience and satisfaction by providing a quick contact match feature on the user interface which provides a unified view to display a list of recent phone call records and contacts that match a contact result search entered on the search keypad. In selected embodiments, the softphone user interface may be embodied in a smart mobile phone, such as an iPhone or Android phone, which is configured with a display screen interface view which displays recent phone call records and contacts in a unified view area such that, once a user starts typing on the T9 (predictive text) keypad to find a contact of interest, the display screen interface view automatically switches to display phone call records and contacts which match the predictive text search, thereby reducing the amount of display screen real estate required by conventional devices. In other embodiments, the softphone user interface may be embodied in a smart mobile phone which is configured with a display screen interface view which provides a single screen for switching between different user interface views in response to detecting specified gestures at the display. For example, the display screen interface view may be configured to detect a first gesture on the touch-sensitive surface (e.g., left swipe or other specified finger-dragging pattern) to switch the display screen interface view from a home user interface view to a contacts user interface view, and may be further configured to switch the display screen interface view from the contacts user interface view to the home user interface view upon detecting a second gesture on the touch-sensitive surface (e.g., right swipe or other specified finger-dragging pattern). In other embodiments, the softphone user interface may be configured with a single display screen interface view which switches from a home user interface view to a voicemail user interface view upon detecting a first gesture on the touch-sensitive surface (e.g., slide down or tap or other specified finger-dragging pattern), and which switches from the voicemail user interface view to the home user interface view upon detecting a second gesture on the touch-sensitive surface (e.g., slide up or other specified finger-dragging pattern). In other embodiments, the softphone user interface may be embodied in a smart mobile phone which is configured with a display screen interface view which provides a one-touch call button for presenting a list of calling method options (e.g., WiFi, Access, Mixed) available for selection by the user to switch between calling methods without requiring interaction with the settings interface. In other embodiments, the softphone user interface may be embodied in a smart mobile phone which is configured with a display screen interface view which, upon placing a call to a called party, automatically displays local condition information (e.g., weather, city name, local time, calendar information, etc.) for the called party. For example, the display screen interface view may be configured to display a smart banner element to provide an instant overview of the called party's living conditions.

In this disclosure, improved system, apparatuses, and methods are described for providing an improved softphone feature interface to address various problems in the art where various limitations and disadvantages of conventional solutions and technologies will become apparent to one of skill in the art after reviewing the remainder of the present application with reference to the drawings and detailed description provided herein. Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present disclosure. Some portions of the detailed descriptions provided herein are presented in terms of algorithms and instructions that operate on data that is stored in a computer memory using hardware (such as logic circuits in one or more field programmable gate arrays) and/or using software executing in a computer within data processing hardware (such as an application specific processor or a computer having a processor executing code stored in a non-transitory computer readable medium). Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. And in selected embodiments, the disclosed system, method, and/or computer program product may take the form of computer program product embodied in a computer-usable or computer-readable storage medium (or media) having program code or instructions thereon for causing a processor to carry out aspects of the present disclosure.

Turning now to FIG. 1, there is shown a simplified illustration of a communication network or system 100 in which a communication device 101 communicates with external devices 174, 186. Though illustrated as an iPhone, the communication device 101 may be implemented with any desired device which provides the softphone user interface functionality described herein, including but not limited to a portable device, mobile phone, smart phone, Android phone, tablet Personal Computer (PC), laptop computer, personal media player, personal digital assistant, computer server, or the like. The depicted communication device 101 includes communication hardware and/or software (not shown) along with input/output devices and buttons, including a touch screen display panel 102.

To support a VoIP (Voice over Internet Protocol) communication connection over a wireless or internet network 172, the communication device 101 may include a first communication module or circuit (not shown) for establishing an Internet network connection 171 as a wireless communication link (e.g., WiFi, 3G, 4G, 5G, etc.) or other near field communication link to or from the network 172 in accordance with one or more specified communication protocols. For example, the wireless LAN communication link 171 may be established through a wireless Access Point (AP) (not shown) using the IEEE wireless LAN standard (IEEE 802.11x), though other protocols, such as 3G, 4G, 5G, Bluetooth, Infrared Data Association (IrDA) and the like, can be used. To facilitate communications, the network 172 may include circuit-switched and/or packet-switched technologies and devices, such as routers, switches, hubs, gateways, etc., and/or may include wireline and/or wireless components utilizing, e.g., IEEE 802.11 standards for providing over-the-air transmissions of communications. Through the network 172, the communication link 171 is routed over a call link 173 to the external device 174, or vice versa.

The communication device 101 may also include a cellular communication module (not shown) for establishing a cellular communication link 181 to or from the network 184 in accordance with one or more specified communication protocols for making calls via mobile minutes provided by carriers (e.g., AT&T, T-Mobile, Sprint, etc.). For example, the cellular communication link 181 may be established through a base station communication tower 182 which is operatively connected via communication link 183 to/from a network 184, such as by using the 3G, 4G, or 5G mobile telecommunication standard, though other communication protocols can be used. As will be appreciated, the network 184 may include the public switched telephone network (PSTN). Through the network 184, the communication link 181 is routed over a call link 185 to the external device 186, or vice versa. Such calls are sent to a local access number where local call rates are applied.

With the capability to establish wireless LAN communication links and cellular communication links to external devices, the communication device 101 may be configured to provide a softphone functionality for making VoIP telephone calls over the Internet 172 when available, thereby avoiding the costs and complexities associated with making cellular calls over the PSTN network 184. To this end, the communication device 101 may be programmed with a communication application ("app") that runs on mainstream smart mobile phone, such as iPhone and Android phone, to allow users to make international calls over the WiFi/internet network 172 faster, easier, and at a lower or free cost. For example, the communication app supports the placement of free international calls without dialing an international access number. But in the event that the WiFi/internet network 172 is not available, the programmed app enables the communication device 101 to make charged calls aver the telecom network 181-185 (such as AT&T/T-Mobile/Sprint, etc.).

To support cellular calls, the communication device 101 includes hardware and/or software functionality for providing standard telephony features (DND, Mute, DTMF, Flash, Hold, Transfer etc.), along with additional telecommunication services (such as phone call, voicemail, Direct Inward Dial (DID) number, etc.), call assist features (such as a contact list, call history, etc.), and additional features typical for online messaging, such as user presence indication, video, wide-band audio, and the like. With the introduction of wireless or VoIP call capabilities, these telephony features and services may also be used in connection with WiFi calls, although there are challenges with presenting a large number of telephony features and services on a single touch screen display panel 102 for navigation and selection by the user.

To address these challenges, the communication application programmed in the communication device 101 may include a first softphone user interface (UI) functionality which is configured to generate a unified view 104 on the touch screen display panel 102 which efficiently combine two or more telephony features and services in a single view. In the depicted example embodiment, the first softphone user interface 104 includes a display interface or widget area 105 and an operating interface or widget area 106. The display interface/widget area 105 may be used to display a frame of information on the touch screen 102 of the communication device 101 in response to user input at the operating interface/widget area 106 to perform a specified operation. For example, a unified view phone book or contact list function may be activated so that the operating interface/widget area 106 includes keypads (e.g., an English alphabet keypad, a Chinese phonetic symbol keypad, a numeric keypad, a T9 keypad, or a 20 key keypad) which are displayed for the user to input search term text. With the unified view contact list function activated, the display interface/widget 105 is configured to display a list of recent phone call records and contacts that match a search of the stored contact information which corresponds to search term text entered in the operating interface/widget area 106.

In selected embodiments, the communication device 101 may be embodied in a smart mobile phone, such as an iPhone or Android phone, which is configured with a first softphone user interface (UI) functionality to provide the unified display screen interface view 104 which displays recent phone call records and contacts in a search results frame area 105 once a user starts typing on the T9 (predictive text) keypad input area 106 to find a contact of interest. In this embodiment, the first softphone user interface functionality provides a quick contact match feature whereby the display interface/widget area 105 initially displays, by default, a list of recent phone call records, but once the user starts typing search text on T9 keypad 106, the display interface/widget area 105 automatically switches to matched contact result view for displaying search results, thereby saving precious screen real estate on small mobile phone screen 102. In selected embodiments, the T9 keypad input area 106 is configured to recognize any portion of a stored contact number from the search text that is input to the T9 keypad 106 and find one or more matching contacts for display in the search results frame area 105. In this mode, user selects a contact by tapping the displayed matching contact in the search results frame area 105 to complete the call.

The disclosed first softphone user interface (UI) functionality for the T9 keypad 106 may be configured to provide quick contact matching using programmed contact matching rules to provide name-based for contact matching search results in the search results frame area 105. In selected embodiments, the programmed contact matching rules recognize Chinese character names which are input to the T9 keypad 106 with either the full phonetic spelling or the initial phonetic spelling. For example, contact information for a contact, "沈昶", may be located by inputting either the full phonetic spelling ("S-H-EN") or the initial spelling ("SC"). In other embodiments, the programmed contact matching rules retrieve English name contact search results from the stored contact list based on search terms which are input to the T9 keypad 106 as phone number-based search terms. For example, the phone number-based search terms may include the entire phone number (e.g., 186-1357-2468), or any consecutive part of the phone number (e.g., 135, 1357, 5724, 246, 2468, and so forth) to generate a list of contact search results, including the contact name (e.g., Mr. Tong Wang) corresponding to the entire phone number.

By automatically displaying in the search results frame area 105 phone call records and contacts which match the predictive text search entered in the keypad input area 106, the user may efficiently place a phone call by selecting a displayed contact (e.g., Tanzania89) to initiate automatic call placement to dial directly from the app using the displayed address book contact search results. In addition to simplifying the process of navigating between different user interfaces to find a contact and then place a call, the unified view 104 for displaying the first softphone user interface (UI) functionality also reduces the amount of display screen real estate required to display and place calls, and also enables the user to make international calls without dialing an access number when using a displayed contact to place a WiFi.

Figure 2:
FIG. 2 shows screen shots for illustrating a second softphone user interface functionality for switching between different user interface views in response to detecting specified gestures at the display in accordance with selected embodiments of the present disclosure.

As will be appreciated, the communication application programmed in the communication device 101 may include additional softphone user interface functionality to assist with the navigation and selection of telephony features and services. For example, FIG. 2 shows screen shots 201A, 201B for illustrating a second softphone user interface (UI) functionality 200 which provides a unified view on the touch screen display panel to efficiently switch between different user interface views in response to detecting specified gestures 211, 212. In the depicted example embodiment, the first UI view screenshot 201A depicts a home user interface having a display interface frame area 202, an operating interface frame area 203, and one or more control buttons or widgets, such as a settings button 205 and a contact button icon 206. The depicted home user interface 201A may provide a phone book or contact search function where the display interface frame area 202 displays a list of recent phone call records and contacts that match a search of the stored contact information based on user input of search terms entered at the operating interface frame area 203 which may include keypads (e.g., an English alphabet keypad, a Chinese phonetic symbol keypad, a numeric keypad, a T9 keypad, or a 20 key keypad) for providing user input.

In the disclosed second softphone UI functionality, the display interface frame area 202 may be configured with a gesture detection capability such that a pre-designated touch gesture 211 (e.g., a "swipe left" gesture or touch screen contact) is detected to switch the unified view on the touch screen display panel from the first UI view 201A to a second, different UI view 201B (as indicated by the block arrow pointing to the right). In the depicted example embodiment, the second UI view depicts a contacts user interface having a display interface frame area 204 and one or more control buttons 207, such as a "back" or contact button icon. The depicted contacts user interface 201B displays a plurality of stored contacts as a contact list in the display interface frame area 204 which may be organized and accessed using an alphabetized index 208. When the user desires to access or edit any contact information details, each listed contact may include an access button 210 which may be selected or activated by pressing on the button 210. To enable the user to quickly switch back to the first UI view 201A, the display interface frame area 204 may be configured with a gesture detection capability such that a pre-designated touch gesture 212 (e.g., a "swipe right" gesture or touch screen contact) switches the unified view on the touch screen display panel from the second UI view 201B back to the first view 201A (as indicated by the block arrow pointing to the left). Therefore, convenient operation is provided since the user may switch between different user interface views as needed.

Figure 3:
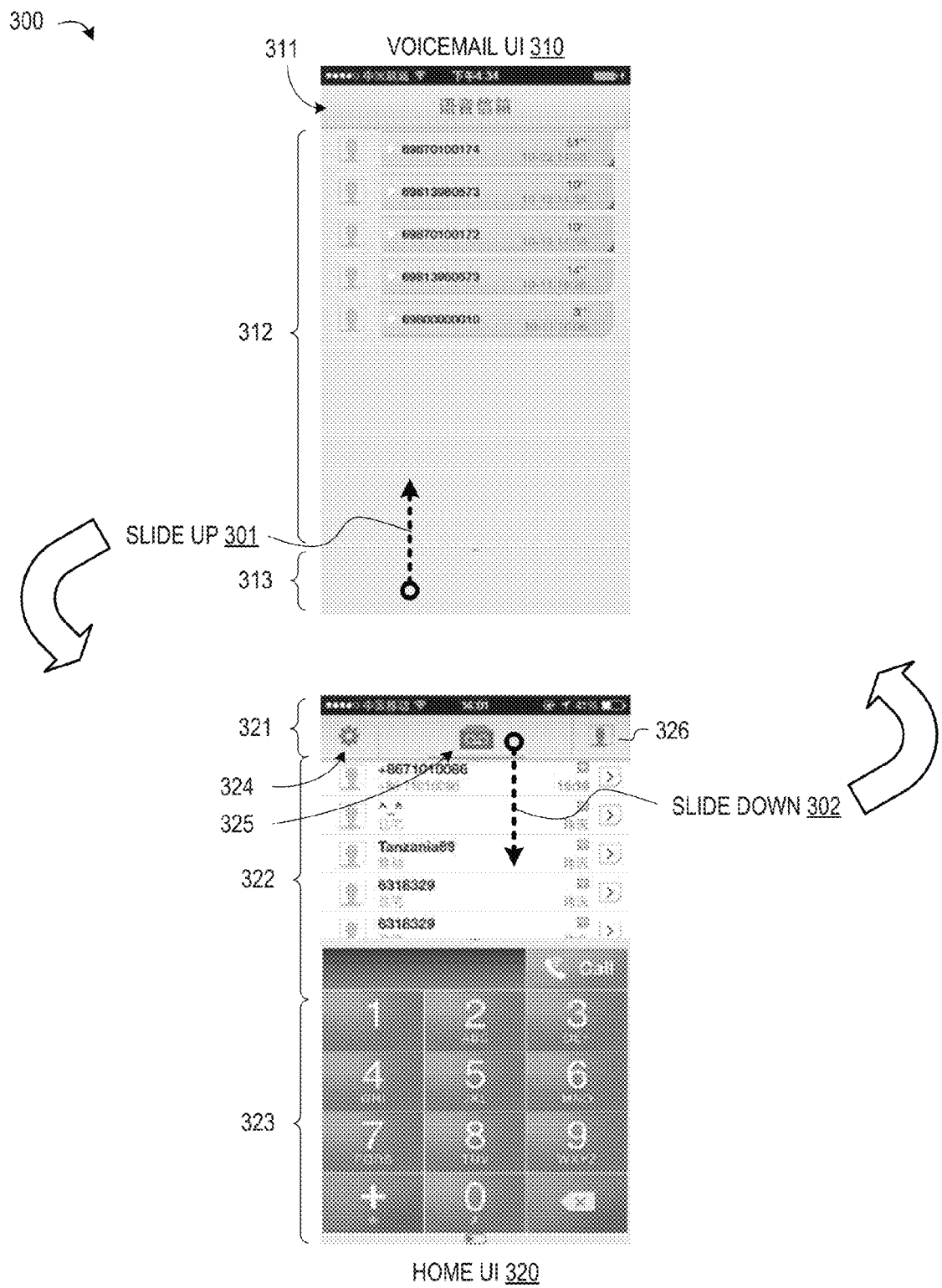
FIG. 3 shows screen shots for illustrating a third softphone user interface functionality for switching between different user interface views in response to detecting specified gestures at the display in accordance with selected embodiments of the present disclosure.

To provide another example of softphone user interface functionality that may be programmed in the communication application of the communication device to assist with the navigation and selection of telephony features and services, reference is now made to FIG. 3 which shows screen shots 310, 320 for illustrating a third softphone user interface (UI) functionality 300 which provides a unified view on the touch screen display panel to efficiently switch between different user interface views in response to detecting specified gestures 301, 302. In the depicted example embodiment, the upper UI view screenshot 310 depicts a voicemail user interface having a first display frame area 311, second display frame area 312, and third display frame area 313. The first display frame area 311 may be used to display one or more labels, control buttons, or widgets relating to the functionality or content of the voicemail user interface. The second display frame area 312 may be used to display a list of one or more stored voicemail messages, along with information identifying, for each voicemail message, the calling party, the time, date, and duration for each message. The third display frame area 313 may be used to provide an operating interface for the voicemail user interface 310. For example, in the disclosed third softphone UI functionality, the third display frame area 313 may be configured with a gesture detection capability such that a pre-designated touch gesture 301 (e.g., a "slide up" gesture or touch screen contact) is detected to switch the unified view on the touch screen display panel from the voicemail user interface 310 to a second, different user interface view 320.

In the depicted example embodiment, the second user interface view 320 depicts a home user interface having a first display frame area 321, second display frame area 322, and third display frame area 323. The first display frame area 321 may be used to display one or more labels, control buttons, or widgets relating to the functionality or content of the home user interface, such as a settings button 324, voicemail button 325, and/or contact button icon 326. The second display frame area 322 may be used to display a list of phone call records and contacts, along with an access button which may be selected or activated to retrieve or change additional information relating to the contact. The third display frame area 323 may be used as an operating interface to provide user input, such as contact search terms, through a navigation button, a confirmation button, and/or keypads (e.g., an English alphabet keypad, a Chinese phonetic symbol keypad, a numeric keypad, a T9 keypad, or a 20 key keypad) for providing user input. In this way, the depicted home user interface 320 may provide a phone book or contact search function where the second display frame area 322 displays a list of recent phone call records and contacts that match a search of the stored contact information based on user input of search terms entered at the third frame area 323. To enable the user to quickly switch back to the first user interface view 310, the first display frame area 321 may be configured with a gesture detection capability such that a pre-designated touch gesture 302 (e.g., a "slide down" gesture or touch screen contact) switches the unified view on the touch screen display panel from the second user interface view 320 back to the first user interface view 310. In an example embodiment, first display frame area 321 is configured to be displayed as a top navigation bar 321 which includes a centered voicemail icon 325 which is programmed with a gesture recognition capability to detect either a tap on it or a "slide up" gesture to bring up or display the voicemail user interface view 310. Therefore, convenient operation is provided since the user may switch between different user interface views as needed.

By automatically switching the unified view on the touch screen display panel between different user interface views in response to detecting specified gestures or finger-dragging patterns at the display, the user may efficiently navigate and select between different telephony features and services without requiring activation of separate, dedicated icons for each feature (e.g., contact button icon 206), such as required with conventional phone applications which display separate icons for the home UI and contact UI interfaces. Instead of tapping on a separate icon (e.g., 206) for each user interface or feature, each user interface view may (e.g., home UI 201A) may be configured to switch to a different interface view (e.g., contacts UI 201B) in response to detecting a specified gesture on the touch screen display panel. As will be appreciated, the specific directions of the gesture detection functions can be reversed from the examples describe above. For example, a "slide left" gesture detected at the home user interface 201A can switch from the home user interface 201A to the contacts user interface 201B, while a "slide right" gesture detected at the contacts user interface 201B can switch from the contacts user interface 201B to the home user interface 201A. Likewise, the direction of the gestures for switching between the voicemail user interface 310 and the home user interface view 320 can be reversed or changed. By providing a more intuitive swiping-based UI switching mechanism, the disclosed softphone user interface functionality saves users time required to lift and place a finger to point and touch specific icon (e.g., contact list button icon 206), and also makes UI switching operations more streamlined and enjoyable to help improve user experience.

Figure 4:
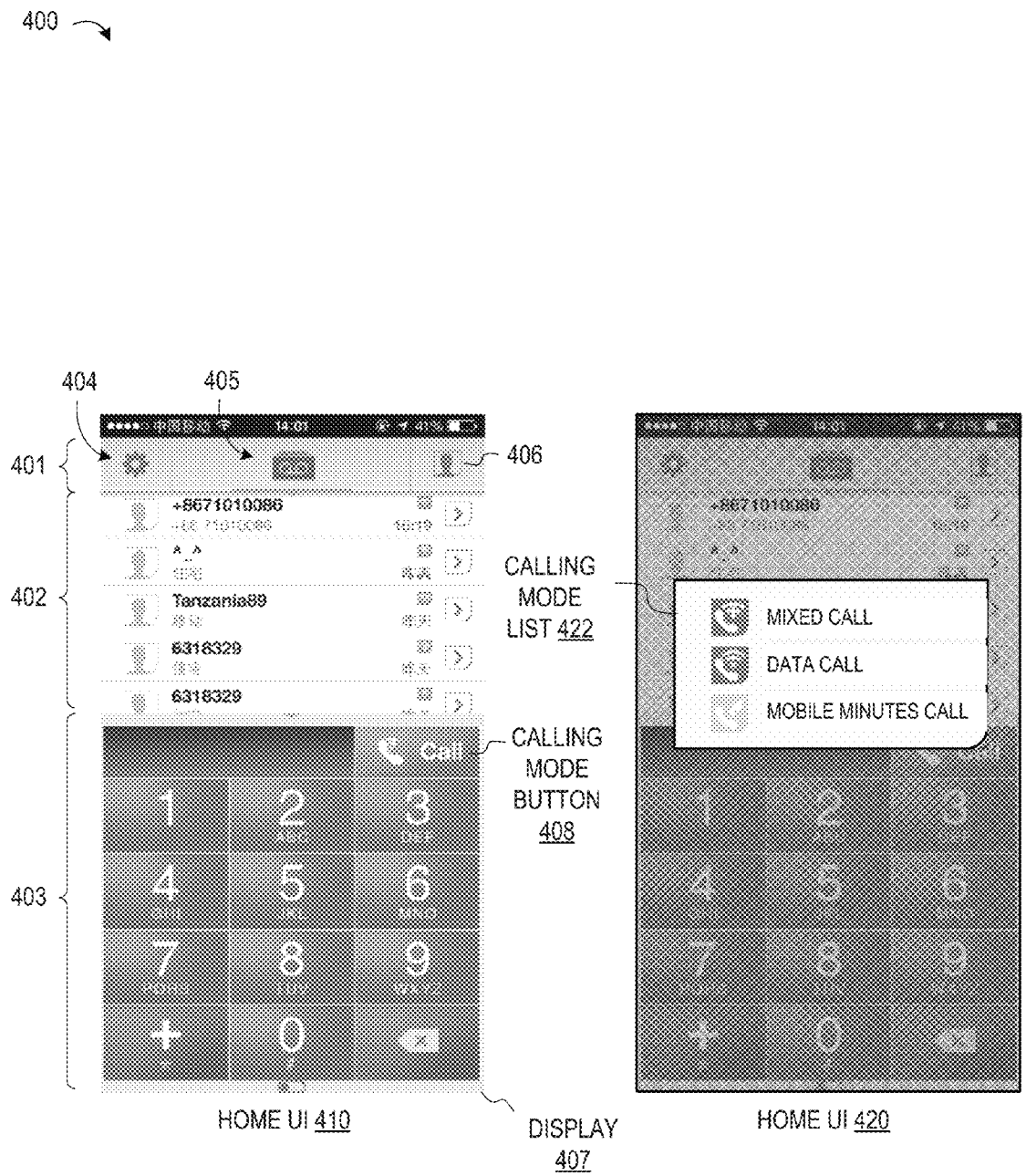
FIG. 4 shows screen shots for illustrating a fourth softphone user interface functionality for providing a one-touch call button for presenting calling method options for selection by the user to switch between calling methods in accordance with selected embodiments of the present disclosure.

To provide another example of softphone user interface functionality that may be programmed in the communication application of the communication device to assist with the navigation and selection of telephony features and services, reference is now made to FIG. 4 which shows screen shots 410, 420 for illustrating a fourth softphone user interface (UI) functionality 400 which provides a unified view on the touch screen display panel with a one-touch calling mode button 406 for presenting calling method options for selection by the user to switch between calling methods. In the depicted example embodiment, the first UI view screenshot 410 shown in the display 407 depicts a home user interface having a first display frame area 401, second display frame area 402, and third display frame area 403. The first display frame area 401, which may be located anywhere in the display 407, may be used to display one or more labels, control buttons, or widgets relating to the functionality or content of the home user interface, such as a settings button 404, voicemail button 405, and/or contact button icon 406. The second display frame area 402 may be located anywhere in the display 407 to display a list of phone call records and contacts, along with an access button which may be selected or activated to retrieve or change additional information relating to the contact. As will be appreciated, the display frame area 402 may be expanded by minimizing the third or keypad display frame area 403. The third display frame area 403 on the display 407 may be used as an operating interface to provide user input, such as contact search terms, through a call button, navigation button, a confirmation button, and/or keypads (e.g., an English alphabet keypad, a Chinese phonetic symbol keypad, a numeric keypad, a T9 keypad, or a 20 key keypad) for providing user input. In selected embodiments, the third display frame area 403 may be configured to slide down to hide the keypad while simultaneously expanding the second display frame area 402. In the depicted home user interface 410, a phone book or contact search function is provided where the second display frame area 402 displays a list of recent phone call records and contacts that match a search of the stored contact information based on user input of search terms entered at the third frame area 403. As depicted, the third display frame area 403 may be used to provide an operating interface with a calling mode button 408 which may be configured with a gesture detection capability, such that a pre-designated touch gesture at the call mode button 408 (e.g., holding or pressing the call mode button 408 for a minimum specified time) is detected to display a list of available calling modes or methods that may be used by the communication device.

In the depicted example embodiment, the second user interface view 420 depicts the home user interface with a pop-up window 422 displayed on the touch screen display panel which lists built-in calling methods which may be selected by the user for the communication device. For example, a "DATA CALL" method may refer to a wireless or Internet-based call (e.g., using WiFi, 3G, 4G, 5G, etc.) where only Internet data is used to place the call using VOIP techniques. Alternatively, an "MOBILE MINUTES CALL" method may refer to a conventional charged or mobile call where mobile minutes provided by a commercial carrier (e.g., AT&T) are used to place the call by sending the call to a local access number where local rates applied. In the "MOBILE MINUTES CALL" method, no data is consumed. In selected embodiments, there may also be a "MIXED CALL" or hybrid call method which refers to a call that combines or merges a Data Call and a Mobile Minutes Call. To enable the user to select and choose which type of calling method to use, the pop-up window 422 may include, for any displayed calling method, a selection icon which is programmed with a gesture recognition capability to detect if the icon is tapped or otherwise selected. Depending on the scenario for a given call, the user can use the pop-up window 422 to switch among the different calling options as required at any time. Therefore, convenient operation is provided since the user may switch between different user interface views as needed.

By providing one-touch access to a touch screen display panel listing of calling methods available for selection by the user, the user may efficiently control the calling method used to place a call without requiring activation of separate, dedicated icon to access the settings user interface (e.g., settings button icon 404), such as required with conventional phone applications which require use of the settings user interface to make a change to the calling method. Instead of tapping on a separate icon (e.g., 404) to enter in the settings interface, each user interface view (e.g., home UI 410) may be configured to detect a specified gesture at a green "Call" button 408 (e.g., pressing the Call button 408 for a threshold time) and to then display the pop-up window 422 right on the screen 420 so that the user can switch the calling method by choosing or tapping a displayed calling option. In selected embodiments, the "Call" button 408 may include or display information identifying the current calling mode being used by the communication device. For example, the depicted home UI 410 includes a symbol for a Data or WiFi call in the "Call" button 408 to indicate the calling method currently being used. By providing one-touch access to the available calling methods, the disclosed softphone user interface functionality saves users time required to access the settings menu before changing calling methods, and also makes calling method control operations more streamlined and enjoyable to help improve user experience.

Figure 5:
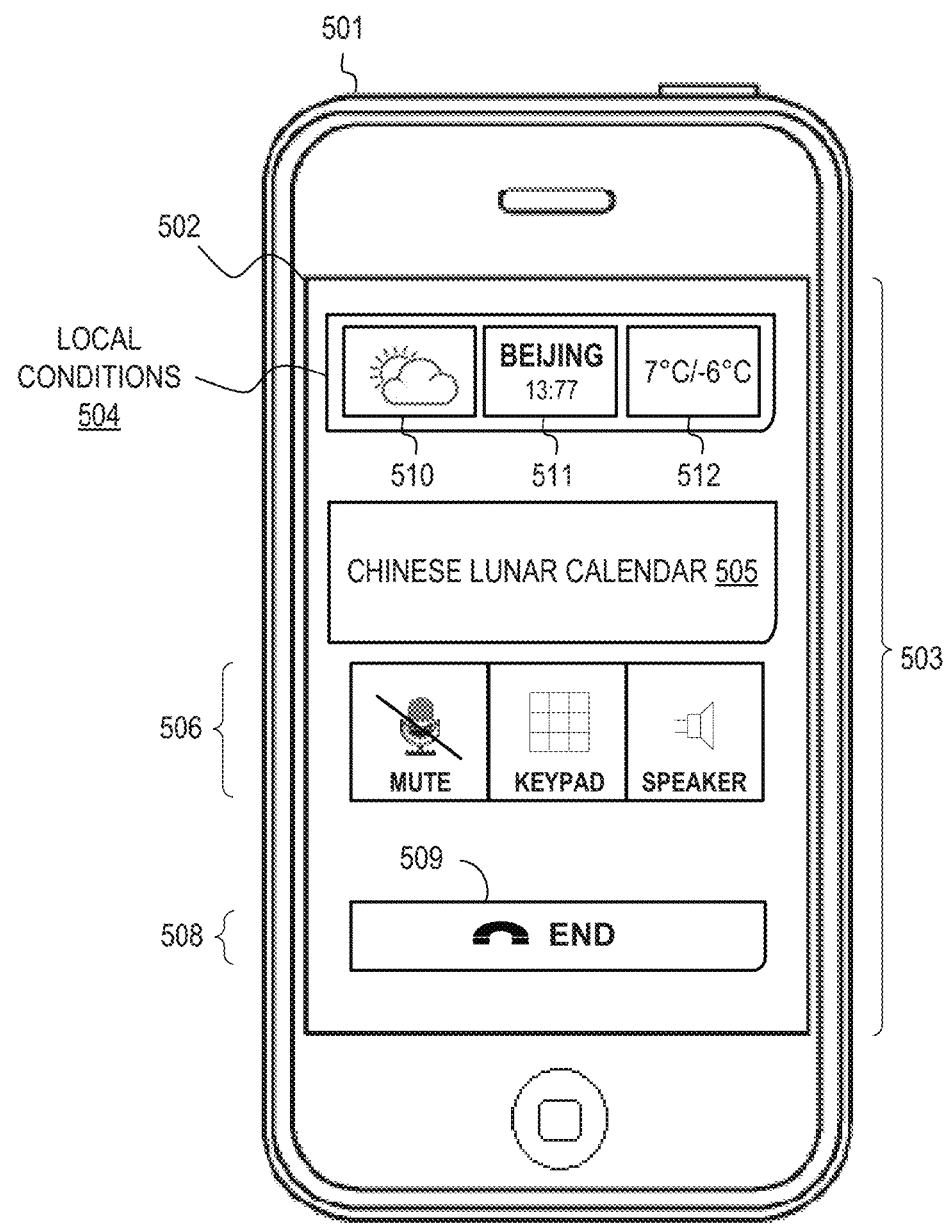
FIG. 5 shows a communication device having a fifth softphone user interface functionality for displaying called party environmental data in accordance with selected embodiments of the present disclosure.

To provide another example of softphone user interface functionality that may be programmed in the communication application of the communication device, reference is now made to FIG. 5 which shows a communication device 501 having a fifth softphone user interface functionality 500 which provides a unified view 503 on the touch screen display panel 502 for displaying called party setting information relating to the conditions or environment of the called party, such as weather, location, date, time, temperature and/or calendar information for the called party. Though illustrated as an iPhone, the communication device 501 may be implemented with any desired device which provides the softphone user interface functionality described herein, including but not limited to a portable device, mobile phone, smart phone, Android phone, tablet Personal Computer (PC), laptop computer, personal media player, personal digital assistant, computer server, or the like. The depicted communication device 501 includes communication hardware and/or software (not shown) along with input/output devices and buttons, including a touch screen display panel 502.

With the capability to establish VoIP and/or cellular communication links to one or more called parties, the communication device 501 may be configured or programmed with a communication application ("app") that runs on mainstream smart mobile phone, such as iPhone and Android phone, to allow users to control the placement of calls using one or more control buttons displayed on the touch screen display panel 502. For example, one or more control buttons 506 may be displayed for placing and controlling a call, such as a mute button for turning off a microphone at the communication device 501, a keypad button for activating the display of an input keypad for data input by the user, and/or a speaker button for turning on a speaker at the communication device 501. In addition, one or more control buttons 508 may be displayed for ending a call. In addition to call control buttons 506, 508, the fifth softphone user interface functionality 500 may be programmed to display called party setting or environmental data 504 upon detecting the placement of a call to a called party. In the depicted example embodiment of the fifth softphone user interface functionality 500, the unified view 503 on the touch screen display panel 502 is configured to display the local conditions of the called party, such as the local weather conditions, the city where the calling party is located, the current time and date for the called party, or other calendar-related information (e.g., local holiday information) for the called party. For example, upon placement of a call, the unified view 503 may display a banner or frame 504 of local conditions for the called party.

To populate the banner 504 with information about the local conditions for the called party, the communication device is programmed to automatically retrieve local condition data associated with the called party using any desired source of information, including but not limited to locally stored data, external databases or websites, and/or information retrieved from the called party. With the retrieved local condition data, the smart banner 504 may be configured to display data and/or icons 510-512 which visually convey the local condition information. For example, a first local condition icon 510 may visually convey an iconic representation of the local weather conditions for the called party. In addition or in the alternative, a second local condition icon 511 may visually convey data or information to identify the name the city where the called party is located and/or the local time for the called party. In addition or in the alternative, a third local condition icon 512 may visually convey data or information about the local weather forecast or conditions for the called party. With the displayed local conditions banner 504, the user will have access to an overview of the called party's current living conditions. This information may be used by the calling party to better understand the local conditions relating to weather conditions, holiday events on the called party's local calendar, etc.

In addition or in the alternative, the unified view 503 on the touch screen display panel 502 may be configured to display calendar information relating to the called party. For example, upon placement of a call to an area or country where Chinese is spoken, the unified view 503 may display a banner or frame 505 which displays the Chinese lunar calendar or information relating thereto. Calendar-related information displayed in the display a banner or frame 505 may include a Holiday notification or information relating to any traditional holiday at the country or region of the called party. In selected embodiments, calendar-related information is retrieved and shown in the display banner/frame 505 for any called party upon entry of a dialed number.

In connection with the description of the various softphone user interface functionalities provided herein, various icon or control widgets are described which are used to control the navigation and operation of the softphone communication features. To provide a visual indication to the user that the specified control functionality is being provided for the softphone communication feature, each icon or control widget may be provided with a uniform or shared design aspect. For example, a control icon or banner may be configured with an icon frame symbol having a single corner that is rounded instead of a square corner. In FIG. 5, the control button 508 is surrounded by an icon frame symbol 509 that is a rectangle-shaped frame having a rounded bottom right corner. A similar icon frame symbol surrounds the local conditions banner 504 or calendar banner 505.

Figure 6:
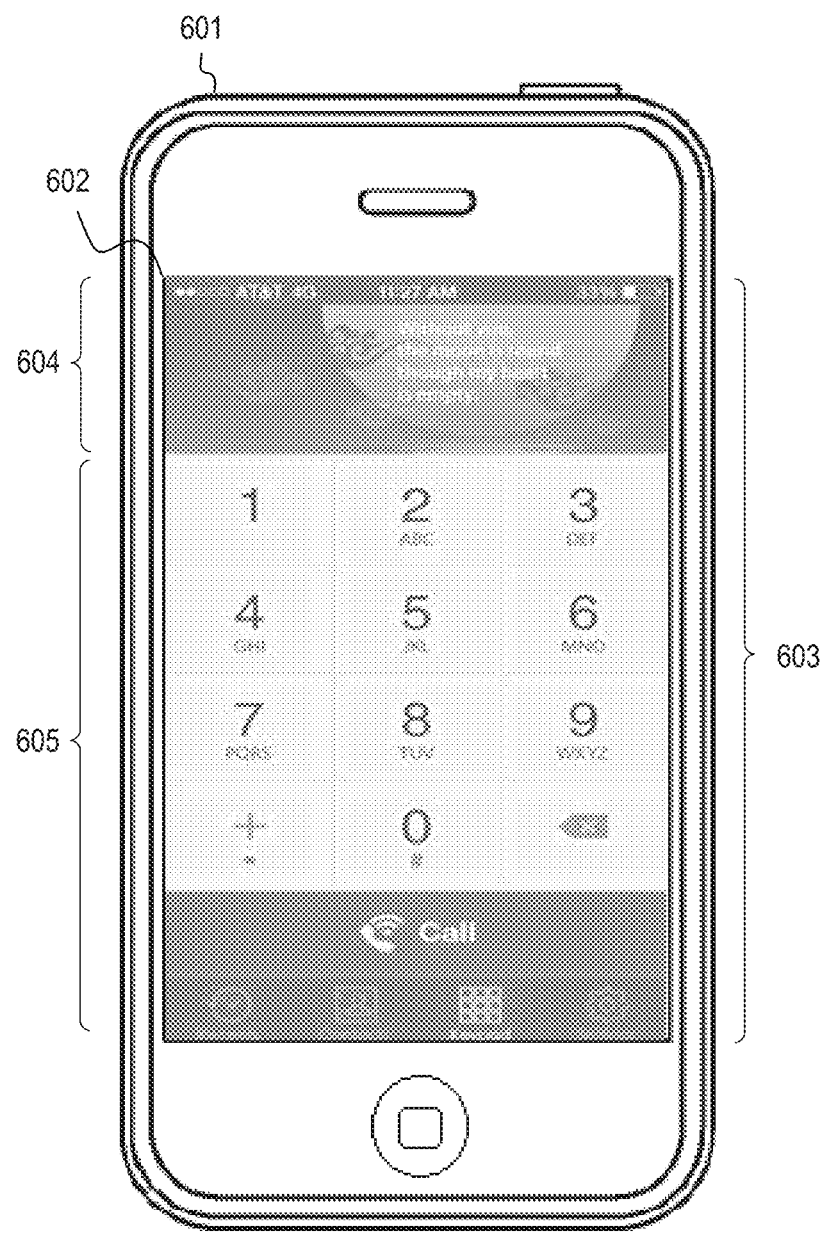
FIG. 6 shows a communication device having a sixth softphone user interface functionality for displaying holiday or calendar-related information relating to the calling party or to the called party in accordance with selected embodiments of the present disclosure.

To provide another example of softphone user interface functionality that may be programmed in the communication application of the communication device, reference is now made to FIG. 6 which shows a communication device 601 having a sixth softphone user interface functionality 600 which provides a unified home user interface view 603 on the touch screen display panel 602 for displaying holiday or calendar-related information relating to the calling party or to the called party. Though illustrated as an iPhone, the communication device 601 may be implemented with any desired device which provides the softphone user interface functionality described herein, including but not limited to a portable device, mobile phone, smart phone, Android phone, tablet Personal Computer (PC), laptop computer, personal media player, personal digital assistant, computer server, or the like. The depicted communication device 601 includes communication hardware and/or software (not shown) along with input/output devices and buttons, including a touch screen display panel 602.

With the capability to establish VoIP and/or cellular communication links to one or more called parties, the communication device 601 may be configured or programmed with a communication application ("app") that runs on mainstream smart mobile phone, such as iPhone and Android phone, to allow users to control the placement of calls using one or more control buttons displayed on the touch screen display panel 602. For example, a user input frame 605 may include one or more control buttons that are displayed for placing and controlling a call, such as a Call button for placing a call, a Recents button for displaying recent call information, a Contacts button for listing user contacts, a Keypad button for activating the display of an input keypad for data input by the user, and/or a Settings button for accessing device control settings. In addition to user input frame 605, the sixth softphone user interface functionality 600 may be programmed to automatically retrieve and display calendar-related information in a display region or frame 604 prior to placement of a call. In the depicted example embodiment of the sixth softphone user interface functionality 600, the unified view 603 on the touch screen display panel 602 shows a home user interface which is configured to display calendar-related information for frequently-dialed countries in the display region or frame 604. For example, if a user or customer frequently places calls to China, the communication device 601 is programmed to automatically retrieve and display Chinese traditional holidays on specific dates. In the example of FIG. 6, the display region/frame 604 displays a blessing from the Mid-Autumn Day which occurs on the $15^{th}$ day of the $8^{th}$ lunar month in the Chinese calendar.

Figure 7:
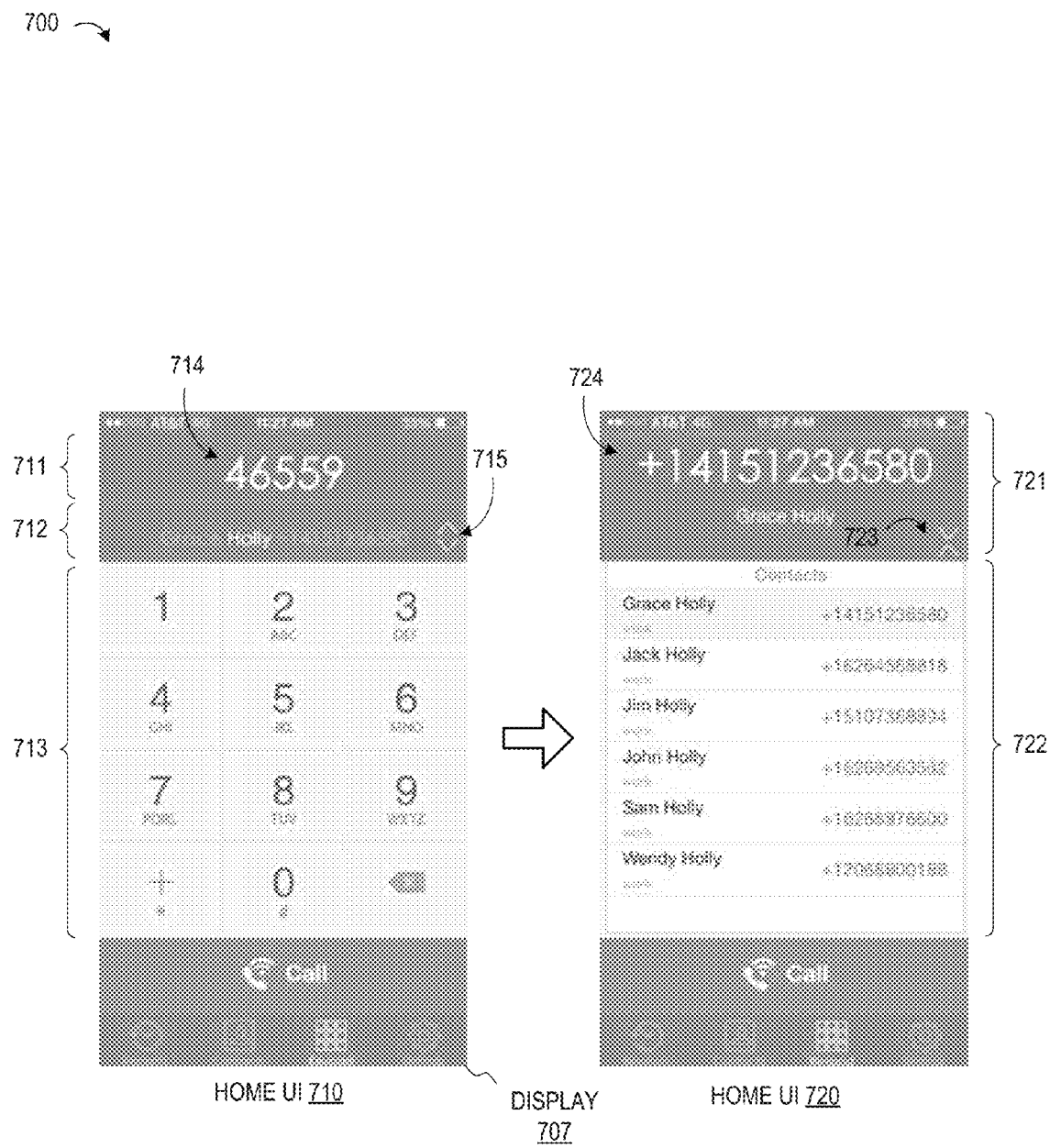
FIG. 7 shows a communication device having a seventh softphone user interface functionality for a contact search window searching user contact information for display and selection in accordance with selected embodiments of the present disclosure.

To provide another example of softphone user interface functionality that may be programmed in the communication application of the communication device to assist with the navigation and selection of telephony features and services, reference is now made to FIG. 7 which shows screen shots 710, 720 for illustrating a seventh softphone user interface (UI) functionality 700 which provides a unified view on the touch screen display panel with a contact search window 711 for quickly and efficiently searching user contact information for display and selection. In the depicted example embodiment, the first UI view screenshot 710 shown in the display 707 depicts a home user interface having a first contact search window display frame area 711, a second contact results display frame area 712, and a third keypad display frame area 713. The first contact search window display frame area 711, which may be located anywhere in the display 707, provides a contact search window which is configured to search for names or parts of names based on numeric data entries from the third keypad display frame area 713. As the user enters keypad numbers (e.g., 46559) from the third keypad display frame area 713 which correspond to the letters (e.g., H=4, O=6, L=5, L=5, Y=9) of the name (e.g., Holly) being searched, the keypad numbers being entered (e.g., 16559) are displayed in the first contact search window display frame area 711. In selected embodiments, the communication device may be programmed to automatically search for contacts using only the input name abbreviation of the initial letter of a contact name search.

As the contact search terms are entered into the first contact search window display frame area 711, the second contact results display frame area 712, which may be located anywhere in the display 707, displays a search result listing (e.g., "Grace Holly +14151236580) of a first contact search result corresponding to the search data entered in the first contact search window display frame area 711. As will be appreciated, the search data entered in the contact search window display frame area 711 may return a plurality of possible matching contact search results. In such cases, the communication device may be programmed to automatically sort and select a top ranked search result in the second contact results display frame area 712 using any desired sorting algorithm. For example, the most-frequently called party (Grace Holly) may be listed, or the most recently called party may be listed, or the party who most recently called the user may be listed. In selected embodiments, the search methods, referred to as T9 search methods, can be switched on or off in the default or user settings options, depending on the application or version. For example, phones that support this function (e.g., Android phones) may have the T9 search method turned "on" by default, while phones that do not support this function (e.g., IOS phones) would not. In other embodiments, the user can turn the T9 search method on or off as they prefer for both Android and IOS phones that support the T9 search method. In selected embodiments, the second contact results display frame area 712 may also include an "expanded results" button 715 which may be configured with a gesture detection capability, such that a pre-designated touch gesture at the button 715 (e.g., touching or pressing the button 715 for a minimum specified time) is detected to display a list of additional contact search results.

As referenced above, the third keypad display frame area 713 on the display 707 may be used as an operating interface to provide user input of contact search terms through a keypad (e.g., an English alphabet keypad, a Chinese phonetic symbol keypad, a numeric keypad, a T9 keypad, or a 20 key keypad) for providing user input. In the depicted home user interface 710, keypad-based contact search function is provided where the operating interface correlates the numbers entered at the keypad with names stored in the user's contact list without requiring more elaborate keypad input techniques for specifying a specific letter with an entered keypad number.

In the depicted example embodiment, the second user interface view 720 depicts the home user interface with a list of additional contact search results which may be displayed upon activation of the "expanded results" button 715 in the first user interface view 710. In the depicted example embodiment, the second UI view 720 depicts the complete phone number and contact name for a selected contact in a first display interface frame area 721. In addition, the second UI view 720 displays a contact search result list (e.g., contacts including the name "Holly) in a second display interface frame area 722 which corresponds to the search term text (e.g., 46559) entered in the operating interface/widget area 711. The depicted list of additional contact search results displayed in the display interface frame area 722 which may be organized as an alphabetized list. When the user desires to access or edit any contact information details, each listed contact may be selected or activated by pressing on the contact name. Once selected, the contact may then be called by selecting or touching the "call" button. To enable the user to quickly switch back to the first UI view 710, the first display interface frame area 721 may be configured to include an "reduce results" button 723 which may be configured with a gesture detection capability, such that a pre-designated touch gesture at the button 723 is detected to collapse the list of additional contact search results. Therefore, convenient operation is provided since the user may quickly and efficiently search for contacts based on partial contact name searches and may quickly switch between different user interface views as needed to see expanded contact search results.

Figure 8:
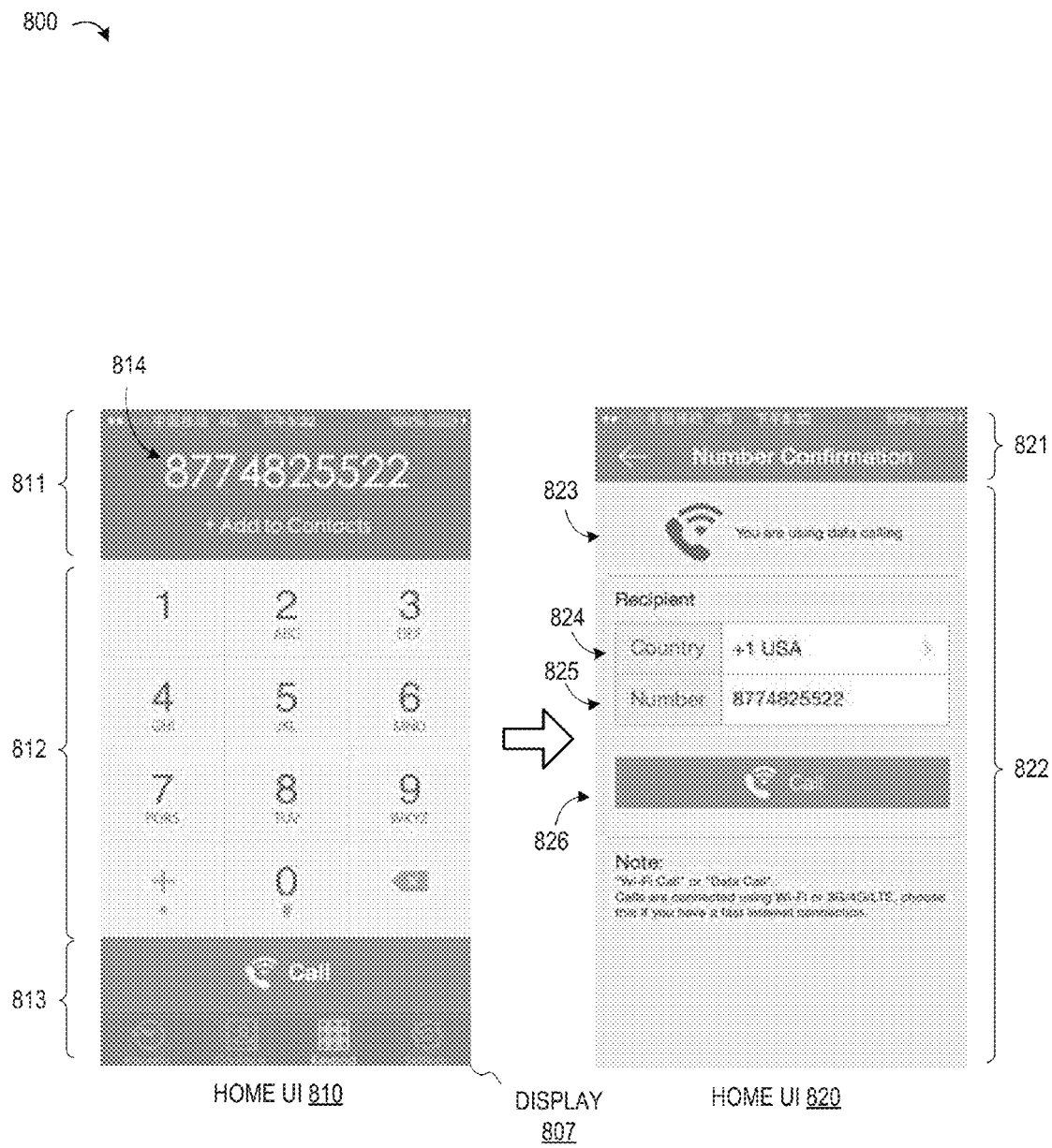
FIG. 8 shows a communication device having a eighth softphone user interface functionality for automatically identifies the country code for the called party according to customer's calling preferences in accordance with selected embodiments of the present disclosure.

To provide another example of softphone user interface functionality that may be programmed in the communication application of the communication device to assist with the navigation and selection of telephony features and services, reference is now made to FIG. 8 which shows screen shots 810, 820 for illustrating an eighth softphone user interface (UI) functionality 800 which automatically identifies the country code for the called party according to customer's calling preferences. In the depicted example embodiment, the first UI view screenshot 810 shown in the display 807 depicts a home user interface having a first called number display frame area 811, a second keypad display frame area 812, and a third user input frame 813. The first called number display frame area 811, which may be located anywhere in the display 807, displays the dialing number (e.g., 8774825522) as the user enters keypad numbers in the keypad display frame area 812. The second keypad display frame area 812 on the display 807 may be used as an operating interface to provide user input of dialing numbers for calling a party through a keypad (e.g., an English alphabet keypad, a Chinese phonetic symbol keypad, a numeric keypad, a T9 keypad, or a 20 key keypad) for providing user input. In the depicted home user interface 810, first called number display frame area 811 may display a number entered through the second keypad display frame area 812 or from a stored user contact. The third user input frame 813 on the display 807 may include one or more control buttons that are displayed for placing and controlling a call, including a "Call" button for dialing a selected number, a Recents button for displaying recent call information, a Contacts button for listing user contacts, a Keypad button for activating the display of an input keypad for data input by the user, and/or a Settings button for accessing device control settings.

In selected embodiments, the communication device may be programmed to automatically detect when entry of a dialed number is complete, either by counting the number of entered digits or detecting the activation of the "Call" button in the third user input frame 813. Upon detection of a complete or dialed number, the communication device may be programmed to automatically detect whether a country code for the called number has been specified or entered. If not, the programmed functionality at the communication device prompts the user to provide the required country code information, such as by automatically providing a second user interface view 820 which depicts a number confirmation window 821 and call window 822. In the number confirmation window 821, the number confirmation functionality of the second UI view 820 is specified. In the call window 822, one or more fields are displayed relating to the call being placed. For example, a calling method field 823 specifies What type of call is being placed, such as a Data call or Calling Minutes call. In the called number field 825, the dialed number is automatically displayed based on the number entered in the first called number display frame area 811. In a country code field 824, the user is prompted to enter or confirm a country code for the number being called. In selected embodiments, the country code field 824 is automatically populated with the required country code according to customer's calling preferences. If a chance to the country code is required, the country code field 824 may include a drop-down menu option for selecting a different country code. Once the dialed number and associated country code are confirmed, the selected country code information is stored with the dialed number so that, on any subsequent call to this number, the dialing sequence will automatically include the stored country code in the dialing sequence without requiring confirmation of the country code. Therefore, convenient operation is provided since the user may quickly and efficiently place international calls without manually entering the required country code at each call. The call window 822 may also include a "Call" button 826 which may be touched or activated to place the call to the dialed number. In selected embodiments, the "Call" button 826 may include or display information identifying the current calling mode being used by the communication device. For example, the depicted "Call" button 826 includes a symbol for a Data or WiFi call to indicate the calling method currently being used.

Figure 9:
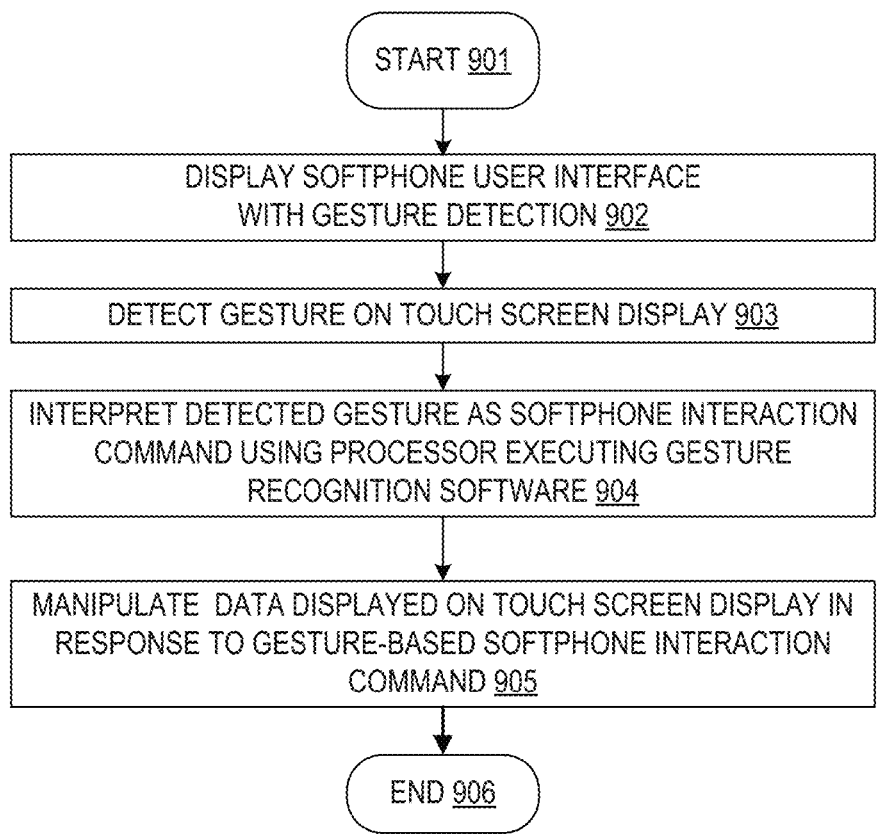
FIG. 9 depicts an example flow diagram of a method for using a softphone user interface in accordance with selected embodiments of the present disclosure.

To illustrate selected embodiments for the system, apparatus, and methodology for interacting with softphone functionality using one or more touch screen gesture sensors, reference is now made to FIG. 9 which depicts a simplified example flow diagram of an operational methodology 900 for using a softphone user interface having one or more touch screen sensors to interpret human gestures as providing predetermined interaction commands for a softphone communication device in accordance with selected embodiments of the present disclosure. The method starts at step 901 when, for example, a communication device, such as an iPhone or Android phone, is programmed with a communication app that to enable softphone communication functionality.

At step 902, a first softphone user interface is displayed on the touch screen which includes one or more gesture detection icons or display regions that are activated. For example, a softphone communication device, such as an iPhone or Android phone, is programmed with a softphone user interface functionality which displays a unified view which displays a list of recent phone call records and contacts that match a contact result search entered as gesture input on the search keypad. In addition or in the alternative, the communication device may be programmed with softphone user interface functionality for switching between different user interface views in response to detecting specified gestures on the touch screen. In addition or in the alternative, the communication device may be programmed with a softphone user interface functionality which provides a one-touch call button for presenting calling method options for selection by the user. In addition or in the alternative, the communication device may be programmed with softphone user interface functionality for displaying called party environmental data.

At step 903, gesture input from the user is detected at the touch screen display. For example, the location or movement of a finger or stylus may be detected at the touch screen display. In addition, the detected gesture may include the detection of text data input through an input keypad displayed on the touch screen display.

At step 904, the detected gesture information is interpreted as a softphone interaction command using processor executing gesture recognition software to implement various different gesture-based commands. For example, a specified swiping or sliding gesture or data input detected at the touch display screen may be processed by gesture recognition software to automatically derive a softphone interaction command corresponding to the detected gesture information. Examples of such interaction commands include generating contact search results, generating a new user interface view, retrieving status information concerning available calling method options, and/or retrieving environmental data for a called party.

At step 905, the gesture-based interaction command is used to manipulate the data displayed on the touch screen display. This may include displaying contact search results, switching to a different user interface view, displaying calling method options, displaying called party environmental data, and the like. At step 906, the method ends, or otherwise returns back to step 903 to detect and process additional gesture information.

As will be appreciated, the apparatuses and methods described herein use touch screen display technologies to detect user interaction with a display screen interface, whether by way of touching, tapping, swiping, or data input. As will be appreciated, selected aspects of the present disclosure may be embodied in hardware (e.g., as a controller), in processing circuitry (e.g., a processor or controller) executing software (e.g., including but is not limited to firmware, resident software, microcode, etc.) stored in computer readable storage medium, or in some combination of hardware and software elements. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes semiconductor or solid state memory, a portable computer diskette, a hard disk, a dynamic or static random access memory (RAM), a read-only memory (ROM), an erasable programmable read-only memory (EPROM or Flash memory), a magnetic tape storage device, a removable computer diskette, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Figure 10:
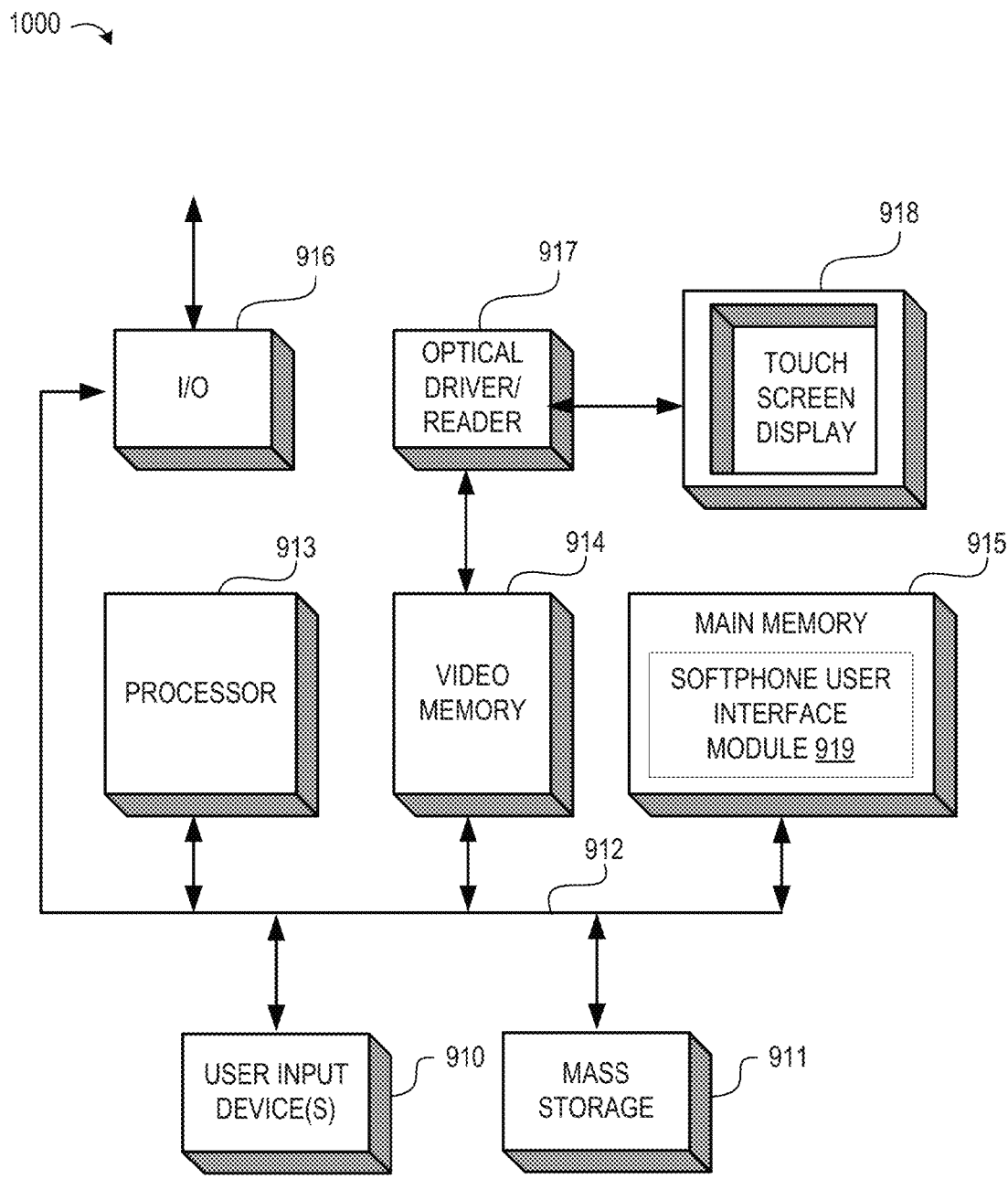
FIG. 10 shows a block diagram of an exemplary computer system which may be used to implement softphone user interface functionality in accordance with selected embodiments of the present disclosure.

To illustrate selected example embodiments of computer-based systems which may be used to implement softphone user interface functionality in accordance with selected embodiments of the present disclosure, reference is now made to FIG. 10 which depicts a block diagram of an exemplary computer system 1000 which may be configured or programmed with a communication application ("app") that runs on mainstream smart mobile phone, such as iPhone and Android phone, to provide one or more softphone user interface functionalities as described herein to facilitate the placement of calls over a WiFi/internet network or cellular network as desired by the user.

The depicted computer system 1000 includes one or more processors 913 coupled to one or more input user device(s) 910 (e.g., a keyboard and/or mouse) over a bi-directional system bus 912. In selected embodiments, one or more optical input camera devices (not shown) may be connected to the system bus 912. The input user device(s) 910 provide one avenue for user input to the computer system 1000 and communicate that user input to processor 913. The computer system 1000 may also include a video memory 914, main memory 915 and mass storage 911, all coupled to bi-directional system bus 912. The mass storage 911 may include both fixed and removable media, such as other available mass storage technology. Bus 912 may contain, for example, 32 address lines for addressing video memory 914 or main memory 915. The system bus 912 also includes, for example, an n-bit data bus for transferring DATA between and among the components, such as processor(s) 913, main memory 915, video memory 914 and mass storage 911, where "n" is, for example, 32 or 64. Alternatively, multiplex data/address lines may be used instead of separate data and address lines. The processor 913 may, in selected embodiments, be implemented as a microprocessor manufactured by Motorola Inc. of Illinois, Intel Corporation of California, or Advanced Micro Devices of California, though any other suitable single or multiple microprocessors or microcomputers may be used. Main memory 915 may be formed with dynamic random access memory (DRAM) or any other suitable memory media. Video memory 914 may be implemented as a dual-ported video random access memory, with one port of the video memory 914 coupled to an optical driver/reader 917 for driving display information to the touch screen display 918 and for detecting and receiving gesture input at the touch screen display 919.

The depicted computer system 1000 may also include one or more I/O device(s) 916 which provide connections to peripheral devices, such as a printer, and may also provide a direct connection to one or more remote server computer systems via a telephone link or to the Internet via an ISP. I/O device(s) 916 may also include a network interface device to provide a direct connection to one or more remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs are generally stored as code in mass storage 911 until loaded into main memory 915 for execution. For example, the main memory 915 may store a softphone user interface software module 919 which is operative to process gesture signals detected at the touch screen display 918 and generate therefrom one or more interaction commands for controlling or manipulating information displayed on the touch screen display 918.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By now, it should be appreciated that there has been provided herein a method, system, apparatus, and computer program product stored in a computer readable storage medium for operating a mobile communication device as a softphone to place Internet phone calls. In the disclosed methodology, a mobile communication device (such as a cellular telephone, a smartphone, an iPhone, or an Android phone) is provided with a touch display screen and is programmed with a communication application to operate the mobile communication device as a softphone to place Internet phone calls. On the touch display screen, a home user interface is displayed which includes a unified view of a display interface area and a keyboard interface area. Upon detecting a touch input on the home user interface, a second user interface is displayed on the touch display screen which displays user call information in response to receiving the touch input on the home user interface, where the second user interface has a same size and position as the home user interface. In selected embodiments, the second user interface includes one or more contacts which are displayed at the display interface area and which match contact search input data that is detected at the keyboard interface area of the home user interface. In such embodiments, the detection of contact search input data is performed by detecting a portion of a stored contact number at the keyboard interface area, such that the displayed second user interface includes one or more contacts matching the portion of the stored contact number which are displayed in the display interface area. In other embodiments, the second user interface includes a contacts user interface for displaying one or more contacts stored on the mobile communication device in response to detecting a first slide operation on the display interface area of the home user interface. In other embodiments, the display interface area of the home user interface may display an alphanumeric identifier for a contact search result which matches numeric contact search input data detected at the keyboard interface area, where the contact search result is selected from a ranked list of stored contacts having alphanumeric identifiers which match the alphanumeric identifier for the contact search result. In such embodiments, the second user interface may display the ranked list of stored contacts having alphanumeric identifiers which match the alphanumeric identifier for the contact search result. In other embodiments, the second user interface includes a voicemail user interface for displaying one or more voicemail messages stored on the mobile communication device in response to detecting a first slide operation on the display interface area of the home user interface. In such embodiments, touch display screen switches from the second user interface back to the home user interface upon detecting a second slide operation on the second user interface. In other embodiments, the second user interface displays one or more calling methods available for selection to control placement of calls on the mobile communication device in response to detecting a call button being pressed for a minimum specified hold time. In selected embodiments, the available calling methods are displayed in a pop-up window which lists a "DATA CALL" calling method for placing an Internet-based call using VOIP techniques and a "MOBILE MINUTES CALL" calling method for placing a charged call through a commercial carrier that is accessed through a local access number. In addition or in the alternative, the touch display screen of the mobile communication device may display a banner for displaying called party environmental data associated with an Internet phone call placed to a called party by the mobile communication device. As part of or prior to the home user interface, the touch display screen of the mobile communication device may include a banner for displaying calendar-related holiday information associated with frequently called parties called by the mobile communication device. And when international calls are placed, the second user interface may display a call window comprising a called number field and a country code field which is automatically populated with required country code information for a called number according to user calling preferences.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. In addition, the illustrated flowchart and block diagrams depict the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of operating a mobile communication device as a softphone to place Internet phone calls, comprising:
   displaying on a touch display screen of the mobile communication device a home user interface comprising a unified view of a display interface area and a keyboard interface area;
   detecting a touch input on the home user interface;
   displaying on the touch display screen a second user interface for displaying user call information in response to receiving the touch input on the home user interface, where the second user interface has a same size and position as the home user interface.

2. The method of claim 1, wherein the mobile communication device comprises a cellular telephone, a smartphone, an iPhone, or an Android phone.

3. The method of claim 1, wherein the mobile communication device is programmed with a communication application to perform the method of operating the mobile communication device as a softphone to place Internet phone calls.

4. The method of claim 1, where detecting the touch input comprises detecting contact search input data at the keyboard interface area, and where displaying the second user interface comprises displaying in the display interface area one or more contacts matching the contact search input data.

5. The method of claim 4, where detecting contact search input data comprises detecting a portion of a stored contact number at the keyboard interface area, and where displaying the second user interface comprises displaying in the display interface area one or more contacts matching the portion of the stored contact number.

6. The method of claim 1, where detecting the touch input comprises detecting a first slide operation on the display interface area, and where displaying the second user interface comprises displaying a contacts user interface for displaying one or more contacts stored on the mobile communication device.

7. The method of claim 6, further comprising detecting a second slide operation on the contacts user interface and switching the touch display screen back to the home user interface in response to detecting the second slide operation.

8. The method of claim 1, where detecting the touch input comprises detecting a first slide operation on the display interface area, and where displaying the second user interface comprises displaying a voicemail user interface for displaying one or more voicemail messages stored on the mobile communication device.

9. The method of claim 8, further comprising detecting a second slide operation on the voicemail user interface and switching the touch display screen back to the home user interface in response to detecting the second slide operation.

10. The method of claim 1, where detecting the touch input comprises detecting a call button being pressed for a minimum specified hold time, and where displaying the second user interface comprises displaying one or more calling methods available for selection to control placement of calls on the mobile communication device.

11. The method of claim 10, where displaying one or more calling methods comprises displaying a pop-up window which lists a "DATA CALL" calling method for placing an Internet-based call using VOIP techniques and a "MOBILE MINUTES CALL" calling method for placing a charged call through a commercial carrier that is accessed through a local access number.

12. The method of claim 1, further comprising displaying on the touch display screen of the mobile communication device a banner for displaying called party environmental data associated with an Internet phone call placed to a called party by the mobile communication device.

13. The method of claim 1, further comprising displaying on the touch display screen of the mobile communication device a banner for displaying calendar-related holiday information associated with frequently called parties called by the mobile communication device.

14. The method of claim 1, further comprising displaying an alphanumeric identifier for a contact search result on the display interface area of the home user interface which matches numeric contact search input data detected at the keyboard interface area, where the contact search result is selected from a ranked list of stored contacts having alphanumeric identifiers which match the alphanumeric identifier for the contact search result.

15. The method of claim 14, where displaying the second user interface comprises displaying the ranked list of stored contacts having alphanumeric identifiers which match the alphanumeric identifier for the contact search result.

16. The method of claim 1, where displaying the second user interface comprises displaying a call window comprising a called number field and a country code field which is automatically populated with required country code information for a called number according to user calling preferences.

17. A computer program product stored in a computer readable storage medium, comprising computer instructions that, when executed by a mobile communication device, causes the mobile communication device to operate as a softphone to place Internet phone calls by performing actions comprising:
 displaying on a touch display screen of the mobile communication device a first user interface comprising display interface area and a keyboard interface area;
 detecting a touch input on the display interface area;
 displaying on the touch display screen a second user interface for displaying user call information in response to receiving the touch input on the first user interface, where the second user interface has a same size and position as the first user interface.

18. The computer program product of claim 17, wherein detecting the touch input comprises detecting a call button being pressed for a minimum specified hold time, and where displaying the second user interface comprises displaying a plurality of calling methods available for selection to control placement of calls on the mobile communication device in a pop-up window which lists a "DATA CALL" calling method for placing an Internet-based call using VOIP techniques and a "MOBILE MINUTES CALL" calling method for placing a charged call through a commercial carrier that is accessed through a local access number.

19. The computer program product of claim 17, where displaying the second user interface comprises displaying a call window comprising a called number field and a country code field which is automatically populated with required country code information for a called number according to user calling preferences.

20. The computer program product of claim 17, where displaying the first user interface comprises displaying an alphanumeric identifier for a contact search result on the display interface area of the first user interface which matches numeric contact search input data detected at the keyboard interface area, where the contact search result is selected from a ranked list of stored contacts having alphanumeric identifiers which match the alphanumeric identifier for the contact search result.

21. The computer program product of claim 20, where displaying the second user interface comprises displaying the ranked list of stored contacts having alphanumeric identifiers which match the alphanumeric identifier for the contact search result.

22. The computer program product of claim 17, further comprising computer instructions that, when executed by the mobile communication device, causes the mobile communication device to operate as a softphone to place Internet phone calls by displaying on the touch display screen of the mobile communication device a banner for displaying called party environmental data associated with an Internet phone call placed to a called party by the mobile communication device, the environmental data comprising date, time, weather, and calendar information for the called party.

23. The computer program product of claim 17, further comprising computer instructions that, when executed by the mobile communication device, causes the mobile communication device to operate as a softphone to place Internet phone calls by displaying on the touch display screen of the mobile communication device a banner for displaying calendar-related holiday information associated with frequently called parties called by the mobile communication device.

24. A mobile communication device configured for operation as a softphone to place Internet phone calls, comprising:
- a touch display screen for displaying a home user interface comprising a unified view of a display interface area and a keyboard interface area, and for detecting a touch input on the home user interface, where the touch display screen displays a second user interface for displaying user call information in response to receiving the touch input on the home user interface, where the second user interface has a same size and position as the home user interface.

25. The mobile communication device of claim 24, wherein the mobile communication device comprises a cellular telephone, a smartphone, an iPhone, or an Android phone.

26. The mobile communication device of claim 24, where the touch display screen is configured to detect contact search input data at the keyboard interface area, and to display in the display interface area one or more contacts matching the contact search input data.

* * * * *